United States Patent
Dumoulin et al.

(10) Patent No.: US 10,820,189 B2
(45) Date of Patent: Oct. 27, 2020

(54) INSTALLATION OF A PROFILE IN AN EMBEDDED SUBSCRIBER IDENTITY MODULE

(71) Applicant: IDEMIA FRANCE, Courbevoie (FR)

(72) Inventors: Jérôme Dumoulin, Courbevoie (FR); Alexis Michel, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/462,424

(22) PCT Filed: Nov. 20, 2017

(86) PCT No.: PCT/FR2017/053173
§ 371 (c)(1),
(2) Date: May 20, 2019

(87) PCT Pub. No.: WO2018/091853
PCT Pub. Date: May 24, 2018

(65) Prior Publication Data
US 2019/0364416 A1     Nov. 28, 2019

(30) Foreign Application Priority Data
Nov. 21, 2016   (FR) ...................................... 16 61289

(51) Int. Cl.
*H04M 3/00*    (2006.01)
*H04W 8/20*    (2009.01)
*H04W 8/24*    (2009.01)

(52) U.S. Cl.
CPC ........... *H04W 8/205* (2013.01); *H04W 8/245* (2013.01)

(58) Field of Classification Search
CPC combination set(s) only.
See application file for complete search history.

(56) References Cited

U.S. PATENT DOCUMENTS 9,831,903 B1 * 11/2017 Narasimhan ............ H04W 4/24
2016/0006728 A1    1/2016 Park et al.
(Continued)

FOREIGN PATENT DOCUMENTS

EP    2 963 955 A1    1/2016
EP    3 029 968 A1    6/2016

OTHER PUBLICATIONS

International Search Report dated Mar. 20, 2018 in PCT Application No. PCT/FR2017/053173, 3 pages.
(Continued)

*Primary Examiner* — Justin Y Lee
(74) *Attorney, Agent, or Firm* — MH2 TECHNOLOGY LAW GROUP, LLP

(57) ABSTRACT

A control method and associated devices in an embedded subscriber identity module (eUICC1) co-operating with a terminal (T) includes operations for: receiving identifiers (ID) of services associated with a communications profile (P) to be executed when the profile is in the active state; determining whether each service (S) is supported by an operating system (OS1) of the embedded subscriber identity module (eUICC1), and if not, sending a request to update the operating system (OS1); installing the update enabling the operating system to run the communications profile (P); and sending a request to receive or to continue receiving the communications profile (P) for installing in the embedded subscriber identity module (eUICC1). Also described is a control method performed by a profile provisioning server for supplying the embedded subscriber identity module (eUICC1) with the service identifiers.

18 Claims, 6 Drawing Sheets

(56) References Cited

U.S. PATENT DOCUMENTS

2016/0165433 A1    6/2016  Larignon et al.
2018/0123803 A1*  5/2018  Park ..................... H04W 8/205
2019/0297490 A1*  9/2019  Yang .................... G06F 3/0673

OTHER PUBLICATIONS

Unknown, "Remote Provisioning Architecture for Embedded UICC Technical Specification" (see section 3.1), GSM Association, Version 3.1, May 27, 2016, pp. 1-297.

* cited by examiner

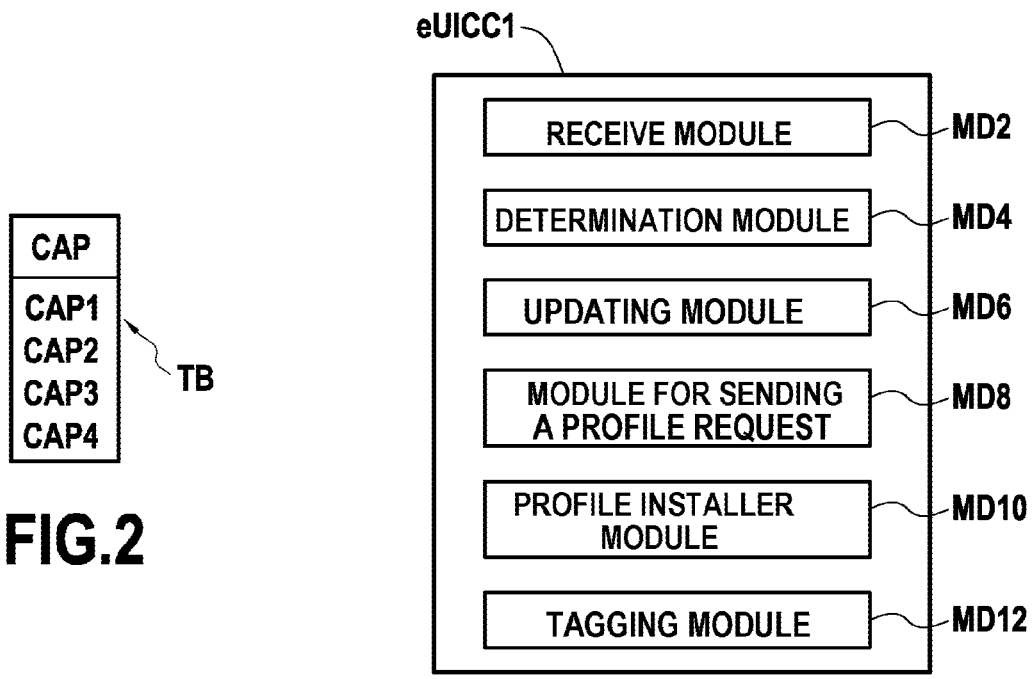
FIG.2
FIG.3
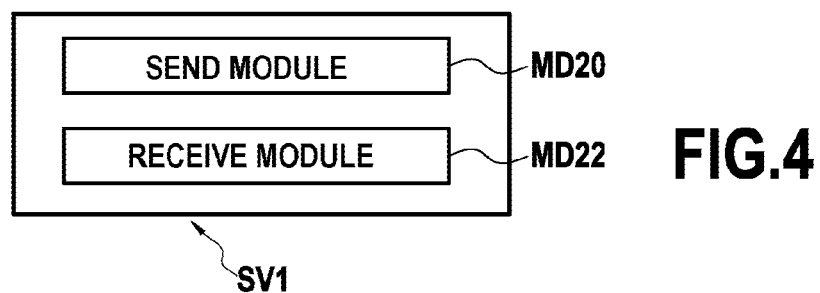
FIG.4
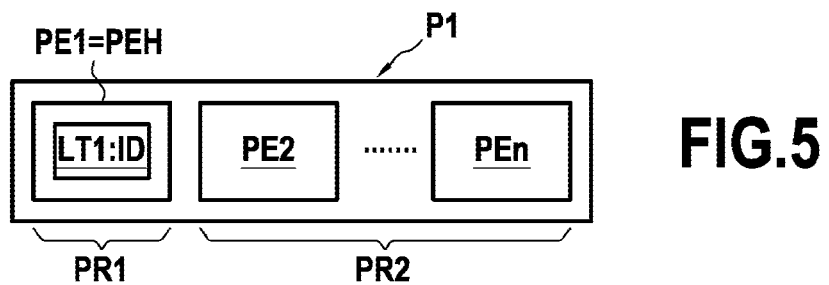
FIG.5

INSTALLATION OF A PROFILE IN AN EMBEDDED SUBSCRIBER IDENTITY MODULE

CROSS-REFERENCE TO RELATED APPLICATIONS

This application is a U.S. National Stage application of International Application No. PCT/FR2017/053173 filed 20 Nov. 2017, which claims priority to French Application No. 1661289 filed 21 Nov. 2016, the entire disclosures of which are hereby incorporated by reference in their entireties.

BACKGROUND OF THE INVENTION

The present invention relates to the field of embedded subscriber identity modules, also known as embedded universal integrated circuit chips (eUICCs), and more particularly it relates to such eUICC modules that are suitable for managing communications profiles.

In known manner, a conventional subscriber identity module (SIM) card is configured to enable a communications terminal with which it co-operates (e.g. such as a mobile telephone), to use the communications network of a single network operator. For that purpose, the SIM card contains subscription data, e.g. such as an international mobile subscriber identity (IMSI), cryptographic keys, and algorithms that are specific to the associated operator. That subscription data is stored in permanent manner in a read only memory (ROM).

When a mobile telephone seeks to use the services of a cell phone network, it sends the subscription data stored in the SIM card as needed for the network operator to obtain access to the requested services. The operator can thus authenticate the user and, by means of a database known as a home location register (HLR) can verify that the user has indeed subscribed to the requested service. If so, the operator then authorizes access to the mobile telephone having the SIM card containing the data that was used for authentication and registration with the operator's network.

Furthermore, reprogrammable SIM cards are now known, and more particularly embedded subscriber identity modules, also referred to as eUICC modules. These reprogrammable modules enable a user to change operator without needing to physically replace the SIM card in the mobile telephone. The main applications of an eUICC module are defined by the Global System for Mobile Communications Association (GSMA) in the GSMA standard SGP.02 v3.1 entitled "Remote provisioning architecture for embedded UICC—technical specification—version 3.1" dated May 27, 2016. An eUICC module is a secure hardware element, generally of small size, that can be integrated in a communications terminal (e.g. a mobile terminal) in order to perform the functions of a conventional SIM card.

In particular, an eUICC module is suitable for containing one or more communications profiles (referred to below simply as "profiles"). Each profile is contained in a dedicated secure domain referred to as "ISD-P" in said GSMA standard. When a communications profile is active, it enables the communications terminal in which it is embedded to access in secure manner the communications network of an associated operator, and to the services defined by the profile in question. By changing the active communications profile in the eUICC module, it is possible to change operator or to modify access to associated services (e.g. voice and/or data services).

It is nowadays possible for an eUICC module that is embedded in a communications terminal to receive a new communications profile remotely. The supply of such a profile is generally initiated by the operator of the communications network associated with the profile, e.g. by means of an SM-SR server in charge of remote management of profiles in eUICC modules.

Once the profile has been received, the eUICC module installs it so as to enable the terminal to communicate with the communications network associated with the profile when that profile is in the active state in said terminal.

The SIMALLIANCE standard entitled "eUICC profile package: interoperable format technical specification" (version 2.0) dated Apr. 18, 2016 (referred to below merely as "SIMALLIANCE") specifies in particular the structure of a communications profile during a stage of being loaded into a terminal, and the way in which an eUICC module remotely recovers such a profile and proceeds to install it.

In particular, the SIMALLIANCE standard makes provision for such a profile being sent to an eUICC module in the form of a plurality of profile elements (PEs). These profile elements are defined in a description language (known as "ASN.1") that is interpretable by the eUICC module, which language is defined jointly by the International Organization for Standardization, the International Electrotechnical Commission, and the International Telecommunication Union.

The first element of the profile sent to the eUICC module during remote downloading is generally a profile header (known as a profile element header (PEH)). In accordance with the SIMALLIANCE standard, the profile header contains a certain amount of information relating to the corresponding profile, and in particular a list of services of the profile that need to be supported by the destination eUICC module.

Still in the SIMALLIANCE standard, each profile service is specified in the list of services in the header as being required or optional depending on the level of importance of the service under consideration. If a service of the profile is specified as being required in the header, it is essential that the eUICC module to which the profile is being sent supports the service in question, and otherwise the profile is refused by the eUICC module and the installation process is abandoned.

Consequently, there presently exists a problem in that installing a profile in an eUICC module runs the risk of failing if said eUICC module is not capable of performing certain services, in particular services that are specified as being required in the header of said profile. Failure of profile installation is undesirable in that resources are used in vain and neither the operator nor the user of the terminal can benefit from a new profile in the event that it needs to be able to perform a service that is not supported by the eUICC module. This results in a lack of flexibility and a risk of premature obsolescence for eUICC modules.

At present there is no satisfactory solution for mitigating the above-mentioned problems, and more generally for managing effectively the installation of a communications profile in an embedded subscriber identity module (or eUICC module).

OBJECT AND SUMMARY OF THE INVENTION/SUMMARY

To this end, the present invention provides a first control method performed by an embedded subscriber identity module (or eUICC1 module) for co-operating with a communications terminal, said electronic module comprising:

receiving at least one identifier of a respective service, of a communications profile, which service is for running when said communications profile is installed and in the active state in the embedded subscriber identity module;

determining whether each service is supported by an operating system of the embedded subscriber identity module;

if not, sending a request to update the operating system;

if an update of the operating system is received in response to sending said request, installing said update enabling the operating system to run said communications profile, at least in part; and after completing said installing, sending a request to receive or to continue receiving the communications profile including said at least one service (S) that is to be installed in said embedded subscriber identity module.

When an eUICC module detects that its operating system does not support at least one service specified in a profile that is to be installed, the invention advantageously enables said eUICC module to obtain the necessary update so as to mitigate, at least in part, its inability to run said at least one non-supported service. Once the update has been performed, the eUICC module can install the profile so that when the profile in question is in the active state it can give access to one or more services associated with said profile.

In a particular implementation, the method comprises, in response to said request to receive or to continue receiving, receiving all or part of the communications profile so as to enable the profile to be installed in the embedded subscriber identity module.

In a particular implementation, the method comprises installing the communications profile in the embedded subscriber identity module once said profile has been obtained in full.

In a particular implementation, said communications profile, once installed and in the active state in the embedded subscriber identity module, authorizes the communications terminal to communicate with a communications network associated with said communications profile.

In a particular implementation, the method includes comparing the capabilities of the operating system with each of the services (S) associated with said at least one identifier;

said determining whether at least one said service is not supported by the operating system being performed on the basis of the result of said comparing.

In a particular implementation, receiving said at least one identifier comprises receiving a first portion of the communications profile, said first portion including said at least one identifier.

In a particular implementation, the first portion is a header portion of the communications profile.

In a particular implementation, after said update has been installed, the method comprises sending said request to continue receiving the communications profile in order to receive at least a second portion of the communications profile for completing said first portion so as to obtain the entire communications profile for installing in the embedded subscriber identity module.

In a particular implementation, said at least one identifier is received from a profile provisioning server, and if at least one said service is not supported by the operating system, the method comprises sending the profile provisioning server a wait request in order to defer receiving at least a portion of the communications profile.

In a particular implementation, while receiving said at least one identifier, the method comprises:

receiving, in association with each service identifier, a degree of importance of said service, said degree of importance indicating whether the corresponding service must necessarily be supported by the operating system when the communications profile is installed in the embedded subscriber identity module.

In a particular implementation, the embedded subscriber identity module proceeds with sending said request to receive or to continue receiving the communications profile only if the operating system, once updated, supports at least each service of the communications profile that is indicated by the associated degree of importance as being necessarily supported by the operating system.

In a particular implementation, if the operating system, once updated, does not support at least one service of the communications profile that is indicated by the associated degree of importance as not necessarily being supported by the operating system, the embedded subscriber identity module:

proceeds with sending said request to receive or to continue receiving the communications profile; and once said profile has been installed in the embedded subscriber identity module, tags the communications profile so as to indicate that at least one service of the communications profile that does not necessarily need to be supported by said operating system is not supported by said operating system.

In a particular implementation, the tagging comprises modifying a parameter in the communications profile installed in the embedded subscriber identity module in order to indicate that the embedded subscriber identity module is configured to run said at least one service of the communications profile in restricted manner.

In a particular implementation, if the operating system, once updated, does not support at least one service of the communications profile that is indicated by the associated degree of importance as not necessarily being supported by the operating system, the method comprises:

sending a notification indicating that the embedded subscriber identity module is configured to run said at least one service of the communications profile in restricted manner.

In a particular implementation, said at least one identifier and each associated degree of importance are received in a header of said communications profile, said header further comprising a parameter, wherein after finishing installing, the embedded subscriber identity module sends said request to continue receiving the communications profile only if the parameter is in a predefined state.

In a particular embodiment, the various steps of the first control method as defined above are determined by computer program instructions.

Consequently, the invention also provides a computer program on a data medium, the program being suitable for being run in an embedded subscriber identity module, or more generally in a computer, the program including instructions adapted to run the steps of the first control method as mentioned above.

The invention also provides a data medium (or recording medium) that is readable by a computer and that includes instructions of a computer program as mentioned above.

Correspondingly, the invention provides a second control method implemented by a profile provisioning server in order to supply a communications profile to an embedded subscriber identity module co-operating with a communications terminal, the second method comprising:

sending to said embedded subscriber identity module at least one identifier of a respective service of a communications profile to be run when said communications profile is installed and in the active state in the embedded subscriber identity module;

causing the sending of said at least one portion of the communications profile to the embedded subscriber identity module to wait; and after the embedded subscriber identity module has updated said operating system, receiving a request to send or to continue sending the communications profile including said at least one service; and in response to said request to send or to continue sending, sending all or part of the communications profile so as to enable said profile to be installed in the embedded subscriber identity module.

In a particular implementation, the various steps of the second control method as defined above are determined by computer program instructions.

Consequently, the invention also provides a computer program on a data medium, the program being suitable for being run in a server, or more generally in a computer, the program including instructions adapted to run the steps of the second control method as defined above.

The invention also provides a data medium (or recording medium) that is readable by a computer and that includes instructions of a computer program as mentioned above.

It should be observed that the programs mentioned in the present description may use any programming language, and be in the form of source code, object code, or code intermediate between source code and object code, such as in a partially compiled form, or in any other desirable form.

Furthermore, the above-mentioned data media may be an entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data media may correspond to a transmissible medium such as an electrical or optical signal, suitable for being conveyed via an electrical or optical cable, by radio, or by other means. The program of the invention may, in particular, be downloadable from an Internet type network.

Alternatively, the data media may correspond to an integrated circuit in which the program is incorporated, the circuit being adapted to execute or to be used in the execution of the method in question.

The invention also provides an embedded subscriber identity module configured to perform the first control method as defined above. More specifically, the invention provides an embedded subscriber identity module (or eUICC module) suitable for co-operating with a communications terminal, said embedded subscriber identity module comprising:

a receive module configured to receive at least one identifier of a respective service of a communications profile, which service is for running when said communications profile is installed and in the active state in the embedded subscriber identity module;

a determination module configured to determine whether each service is supported by an operating system of the embedded subscriber identity module;

an updating module configured, if any of the services is not supported by said operating system, to send a request for updating the operating system, said updating module being configured, if an update of the operating system is received in response to said updating request, to install said update enabling the operating system to run said communications profile at least in part; and a send module configured, after finishing said installing of the update, to send a request to receive or to continue receiving the communications profile including said at least one service that is to be installed in said embedded subscriber identity module.

It should be observed that the various implementations mentioned above with reference to the first control method of the invention and their associated advantages apply in analogous manner to the embedded subscriber identity module of the invention.

The invention also provides a profile provisioning server configured to perform the second control method as defined above. More specifically, the invention provides a profile provisioning server for providing a communications profile to an embedded subscriber identity module co-operating with a communications terminal, the server comprising:

a send module for sending to said embedded subscriber identity module at least one identifier of a respective service of a communications profile to be run when said communications profile is installed and in the active state in the embedded subscriber identity module;

the send module being configured to cause the sending of said at least one portion of the communications profile to the embedded subscriber identity module to wait;

a receive module configured, after the embedded subscriber identity module has updated said operating system, to receive a request to send or to continue sending the communications profile including said at least one service; and a send module being configured, in response to said request to send or to continue sending the communications profile, to send all or part of the communications profile so as to enable said profile to be installed in the embedded subscriber identity module.

In an embodiment, the invention is implemented by means of software and/or hardware components. On these lines, the term "module" as used in this document may correspond equally well to a software component or to a hardware component or to a combination of both software and hardware components.

The invention also provides a system comprising an embedded subscriber identity module as defined above and a profile provisioning server for supplying a communications profile to said embedded subscriber identity module co-operating with a communications terminal, said profile provisioning server comprising:

a send module for sending to said embedded subscriber identity module at least one identifier of a respective service of a communications profile to be run when said communications profile is installed and in the active state in the embedded subscriber identity module;

the send module being configured to cause the sending of said at least one portion of the communications profile to the embedded subscriber identity module to wait; and a receive module configured, after the embedded subscriber identity module has updated said operating system, to receive a request to send or to continue sending the communications profile including said at least one service; and the send module being configured, in response to said request to send or to continue sending the communications profile to send all or part of the communications profile so as to enable said profile to be installed in the embedded subscriber identity module.

BRIEF DESCRIPTION OF THE DRAWINGS

Other characteristics and advantages of the present invention appear from the following description made with reference to the accompanying drawings, which show embodiments having no limiting character. In the figures:

FIG. 2 is a diagram showing a list of capabilities of a FIG. 1 eUICC module, in a particular implementation of the invention;

FIG. 3 is a diagram of an eUICC module in a particular embodiment of the invention;

FIG. 4 is a diagram of a profile provisioning server, in a particular embodiment of the invention;

FIG. 5 is a diagram showing the structure of a communications profile for installing in an eUICC module, in a particular implementation of the invention;

DETAILED DESCRIPTION OF IMPLEMENTATIONS

Figure 1:
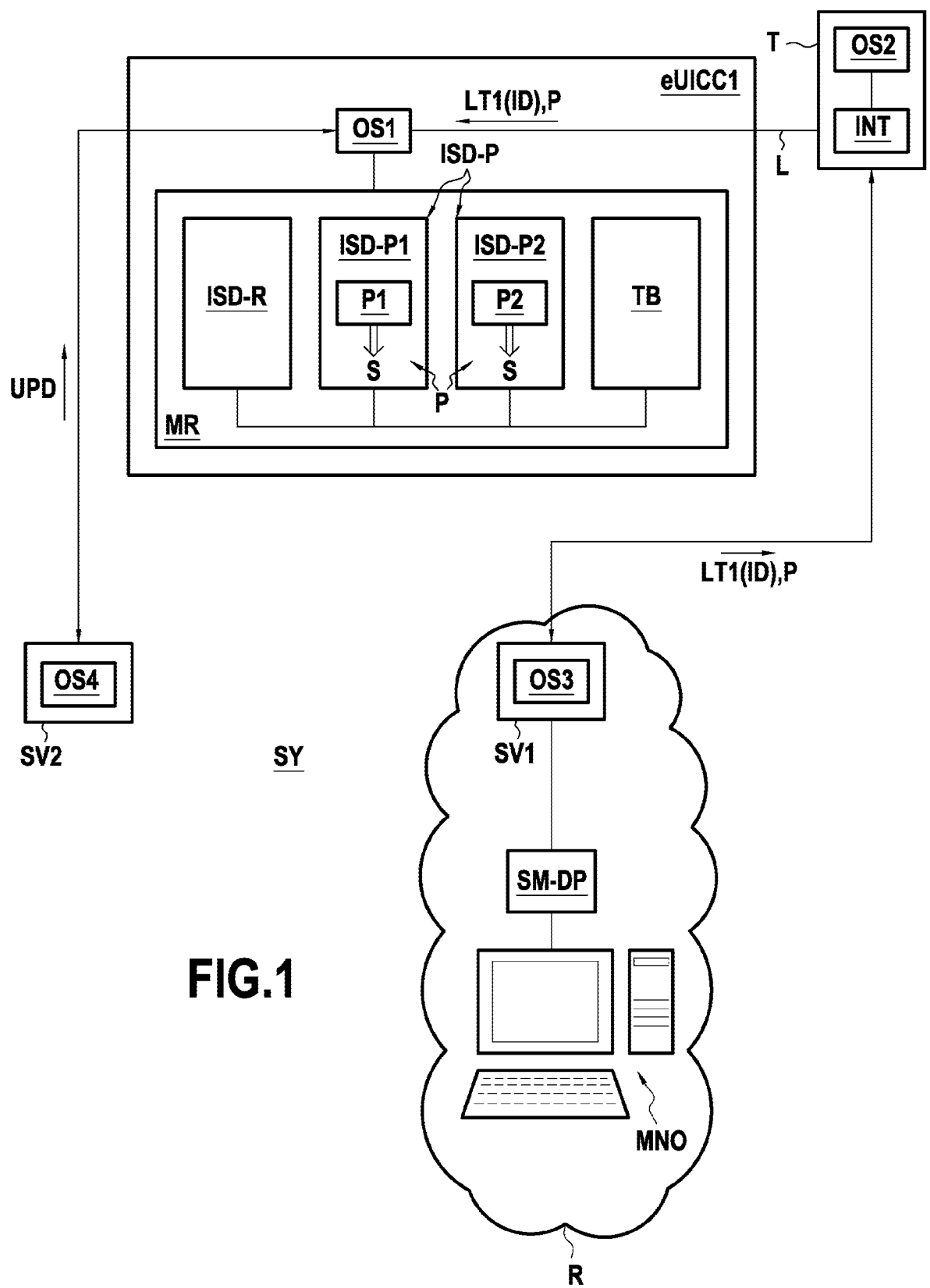
FIG. 1 is a diagram of an eUICC module co-operating with a profile provisioning server and an updating server via terminal, in a particular embodiment of the invention.

The invention proposes preparing the installation of a communications profile in an eUICC module by providing the module with the possibility of updating its own operating system in the event that one or more services specified in the profile for installation are not supported by the operating system of the eUICC module in question. The invention also seeks to install the profile in question once the operating system of the destination eUICC module has been updated.

The invention relates in particular to a method performed by an eUICC module (and also to the eUICC module in question) in order to enable such updating when a profile is to be installed in the eUICC module. The invention also relates to a method performed by a remote server (and also the server itself) co-operating with the eUICC module in order to prepare for the installation of a profile in the eUICC module.

In the present description, a profile is said to be "active" or in the "active" state, when a communications profile is activated in the eUICC module in order to allow the communications terminal (with which the eUICC module co-operates) to communicate with the communications network associated with the profile in question. In accordance with the above-mentioned GSMA standard SGP.02 v3.1 (referred to below as the "GSMA" standard), a profile (or the secure ISD-P domain in which it is contained) is said to be "active" (ENABLE) when its state parameter known as "life cycle" is set to the state '3F'. In that same GSMA standard, a profile is said on the contrary to be "inactive" (DISABLE) when its life cycle state parameter is set to the '1F' state.

In the present description, the term "service" is used to designate any service (or function) that is specified in a communications profile and that might need to be performed by an eUICC module when the profile is installed and in the active state in the eUICC module, and that requires the service to be supported by the operating system of the eUICC module in question.

By way of example, mention may be made of the following services that might be performed by an eUICC module in compliance with the SIMALLIANCE standard:

contactless service (enabling contactless operations to be performed);
the USIM application as defined by 3GPP;
the ISIM application as defined by 3GPP;
the AKA authentication algorithm;
TUAK128: the TUAK AKA authentication algorithm with a key length of 128 bits;
UICC EAP client;
Javacard;
multiple USIM, enabling a plurality of USIMs to be supported at the same time; and
etc.

In the present disclosure, the concept of an "operating system" should be understood broadly, and it covers any software module, software block, or computer program that can be executed by the eUICC module in order to manage and perform one or more communications profiles.

Unless specified to the contrary, elements that are common or analogous to a plurality of figures are given the same reference signs and present characteristics that are identical or analogous, such that these common elements are generally not described again, for reasons of simplicity.

FIG. 1 is a diagram showing the structure of an eUICC module (referenced herein eUICC1) that is configured to co-operate with a communications terminal T in order to give access to a communications network R. By way of example, the module eUICC1 may be soldered or integrated in the terminal T.

In the presently-considered example, the communications network R is a mobile telephone network, and the terminal T is a mobile communications terminal, such as a mobile telephone, for example. Other examples of communications networks R and of communications terminals T are nevertheless possible within the ambit of the invention.

In the presently-described embodiment, the mobile terminal T may use the module eUICC1 to access in secure manner the network R and also the services supplied by the corresponding mobile network R operator (MNO).

In this particular embodiment, the mobile terminal T includes an operating system OS2 that is suitable in particular for controlling a radio interface INT. The radio interface INT of the terminal T is configured to transmit and receive radio communications with the outside, e.g. via an antenna (not shown). By way of example, the radio interface INT comprises in conventional manner, a radio transceiver unit coupled to an antenna (not shown). It is also possible to envisage there being a plurality of radio interfaces present in the terminal T.

In the presently-described embodiment, the module eUICC1 includes an operating system OS1 (stored in a non-volatile memory, a ROM, or a flash memory, for example) that is coupled to a rewritable non-volatile memory MR.

The operating system OS1 constitutes an example of a computer program in the meaning of the invention, which program includes instructions for executing steps of a control method in a particular implementation of the invention. The memory in which the operating system OS1 is to be found thus constitutes an example of a data medium in the meaning of the invention that is readable by a processor (not shown) of the module eUICC1.

As shown in FIG. 1, the non-volatile memory MR of the module eUICC1 also includes a privileged secure domain ISD-R and two ISD-P secondary secure domains, referenced herein ISD-P1 and ISD-P2. Each ISD-P secure domain (or security domain) constitutes a secure compartment of the module eUICC1. It can be understood that the presently-envisaged particular embodiment constitutes merely a non-limiting example of the invention, and the number of ISD-P domains may in particular be adapted to circumstances.

The secure domain ISD-R is privileged in that it is suitable in particular for creating, deleting, activating, or deactivating ISD-P secondary secure domains in the non-volatile memory MR.

Each ISD-P secondary secure domain is suitable for containing a single communications profile P (or operational profile) associated with a particular network operator MNO. Each profile P is thus contained in an ISD-P secure domain that is dedicated thereto. In known manner, a communications profile P includes subscription data (e.g. identifiers (IMSI, etc.), cryptographic keys, algorithms (e.g. for authentication), . . . ) and may also include a file system, applications, and/or predetermined policy rules. In the presently-envisaged example, the profiles P comply with the above-mentioned GSMA standard.

In the example shown in FIG. 1, it is assumed that the memory MR of the module eUICC1 has two secondary secure domains ISD-P1 and ISD-P2, each secondary secure domain being suitable for containing a single respective profile P1, P2, each of which may be in the active state or in the inactive state.

Each of the profiles P1, P2 is configured so that when it is active it authorizes the terminal T to communicate in secure manner with a mobile network R of a network operator MNO associated with said profile. For reasons of simplicity, it is assumed in this example that each of the profiles P1 and P2 is associated with the same communications network R associated with a single network operator MNO, as shown in FIG. 1.

Each profile P1, P2 also specifies at least one service S that can be used by the module eUICC1 when the profile under consideration is in the active state, providing the operating system OS1 of the module eUICC1 supports the service in question. By way of example, each profile includes the subscription data required by the operator MNO of the communications network R in order to obtain access to the required services. The subscription data thus enables the operator to verify that the user has indeed subscribed to the requested service (e.g. by using an HLR database).

The operating system OS1 of the module eUICC1 is configured to support at least one service. Examples of services that might be supported by the operating system OS1 are defined in the SIMALLIANCE standard (e.g. the "contactless", USIM, ISIM, SIM, "Milenage", "Cave", EAP, GBA, "Javacard", . . . services), other types of service nevertheless also being possible. The capability of the operating system OS1 to perform a service specified in a profile may vary depending on circumstances. In the example shown in FIG. 1, the memory MR of the module eUICC1 contains a list TB of the capabilities of the operating system OS1 for performing profile services. On the basis of this list TB, the module eUICC1 is suitable for determining whether or not it supports a given service.

FIG. 2 is a diagram of the content of the list TB in a particular example. In this example, the list TB defines four distinct capabilities CAP1-CAP4 refereed to collectively as CAP. It should be observed that a capability CAP characterizes the suitability of the operating system OS1 for running a single service or a plurality of distinct services, depending on circumstances.

In the example shown in FIG. 1, the module eUICC1 is also suitable via the terminal T (and in particular its radio interface INT), for communicating in secure manner with a profile provisioning server SV1 that, in this example, is a subscription manager-secure routing (SM-SR) server. In this example, the server SV1 forms part of the communications network R associated with the profiles P1 and P2.

By way of example, communication between the module eUICC1 and the terminal T takes place via a link L complying with the ISO 7816 standard (and more particularly the ISO 7816-3 and ISO 7816-4 standards).

In the presently-considered example, the SM-SR server runs an operating system OS3 that is stored in a data medium (not shown).

The module eUICC1 is configured to receive from the remote server SV1 a new profile P and to install that profile in an ISD-P secondary secure domain. The sending of a new profile P to the module eUICC1 may be ordered for example by the operator MNO (e.g. via the SM-DP server as shown in FIG. 1). Once the new profile P has been received and installed in the module eUICC1, the privileged secure domain ISD-R can configure the new profile P to occupy the active state or the inactive state, as required.

As explained in detail below, the module eUICC1 is also configured, prior to downloading the profile P, to receive a list LT1 containing at least one identifier ID of a respective service S specified in the profile P that is to be installed. This list LT1 enables the module eUICC1 to determine which service(s) S need(s) to be supported by its operating system OS1 in order to run the profile P once it has been installed and is in the active state in the module eUICC1.

Furthermore, the module eUICC1 is configured to co-operate with a remote server SV2 for receiving, where appropriate, an update UPD for the operating system OS1 of said module eUICC1. It is assumed herein that the server SV2 is an updating server running an operating system OS4 stored in a data medium (not shown).

The module eUICC1, the terminal T, the profile provisioning server SV1, and the updating server SV2 together form a system SY.

It should be observed that certain elements that are generally present in an eUICC module, in a communications terminal T, or indeed in a communications network R of an operator MNO have voluntarily been omitted since they are not necessary for understanding the present invention. Furthermore, the person skilled in the art understands that certain elements are described herein for facilitating understanding of the invention even though they are not essential or directly involved in implementing the invention. The structure of the system SY shown in FIG. 1 constitutes merely a non-limiting example of the invention.

As shown in FIG. 3, the operating system OS1 of the module eUICC1 in a particular embodiment runs a certain number of modules that are defined as follows: a receive module MD2, a determination module MD4, an updating module MD6, a send module MD8, and a profile installer module PD10. In a particular example, the operating system OS1 also runs a tagging module MD12.

The receive module MD2 is configured to receive at least one identifier ID of a service S of a communications profile P that needs to be run when said profile P is installed and in the active state in the module eUICC1. In the example shown in FIG. 1, the service identifier(s) ID is/are received by the receive module MD2 in the form of a list LT1 that is transmitted by the server SV1 via the terminal T. By way of example, the receive module MD2 receives said at least one identifier ID in a header (or header portion) of the profile P, as explained in greater detail below, but other implementations are nevertheless possible.

The determination module MD4 is configured to determine whether each service specified by the identifier(s) ID received by the receive module MD2 is supported by the operating system OS1 of the module eUICC1. For this purpose, and by way of example, the module eUICC1 compares the identifiers ID received by the receive module MD2 with the capabilities CAP defined in the list TB stored in the memory MR, and on the basis of the result of this comparison, it determines whether each service S specified by the receive identifier(s) ID is supported by the operating system OS1.

In the event that the determination module MD4 detects that at least one service S is not supported by the operating system OS1, the updating module MD6 is configured to send to the updating server SV2 a request to update the operating system OS1.

If an update UPD of the operating system OS1 is received in response to said updating request, the updating module MD6 is also configured to install the update so as to enable the operating system OS1 to run the communications profile P (in full or at least in part).

After the updating module MD6 has completed installing the update UPD, the send module MD8 is configured to send a request to receive the communications profile P (or to continue receiving it in the particular situation in which a portion of the profile has already been received by the module eUICC1), the request including (or specifying) said at least one service S for installing in the module eUICC1. In the example shown in FIG. 1, this request is sent by the send module MD8 to the server SV1.

In response to the above-mentioned request, the profile installer module MD10 is configured to receive or to continue receiving all or part of the communications profile P so as to enable said profile P to be installed in the module eUICC1. Once the entire profile P has been recovered, the installer module MD10 is configured to install the profile P in the module eUICC1.

When the module eUICC1 has installed therein a communications profile P including at least one service that is not supported by its operating system OS1, and when each unsupported service is optional in the sense that it is not required for the operating system OS1 to support it in order to enable the profile to be run by the module eUICC1, then the tagging module MD12 serves to tag that profile to indicate that the operating system OS1 does not support at least one of its services. If such an optional service is tagged, the corresponding profile P is supported only partially by the module eUICC1, but may nevertheless be run within the limit of the profile services that are supported by the module eUICC1.

It can be understood that the above definition of the modules M2 to M12 constitutes merely a non-limiting implementation of the invention and that implementations of the invention are possible that do not include at least one of those modules. At least two of those modules may be combined to form a single module for running in the module eUICC1.

In a particular implementation, and as shown in FIG. 4, the operating system OS3 of the profile provisioning server SV1 runs a certain number of modules, defined as follows: a send module MD20, a receive module MD22, and a determination module MD24.

The send module MD20 is configured to send to the module eUICC1 at least one identifier ID of a service S of a communications profile P that is to be run by the module eUICC1 when said profile P is installed and in the active state in the module eUICC1. By way of example, the send module MD20 transmits the identifier(s) ID to the module eUICC1 in a header (or header portion) of the profile P, as described in greater detail below.

The send module MD20 is also configured to cause the sending of at least a portion of the communications profile P to the module eUICC1 to wait.

More specifically, in the presently-considered implementation, the receive module MD22 is configured, if at least one service is not supported by the operating system OS1, to receive a wait request coming from the module eUICC1 so as to cause the server SV1 (and more particularly the send module MD20) to defer the sending of the profile P to the module eUICC1 (or to defer continuing sending when a portion of the profile has already been sent to the module eUICC1).

Once the operating system OS1 has been updated by the module eUICC1, the receive module MD22 of the server SV1 is configured to receive from the module eUICC1 a request requesting sending of the profile P (or requesting continued sending when a portion of the profile has already been sent to the module eUICC1).

The send module MD20 is also configured, in response to the above-mentioned request to send or to continue sending the communications profile P, to send all or part of the profile P to the module eUICC1 so as to enable said profile P to be installed in the module eUICC1. In this example, receiving the request to send or to continue sending thus terminates the wait of the send module MD20. In the implementations described below, the module eUICC1 co-operates via the terminal T with the profile provisioning server SV1 and with the updating server SV2. Various implementations are possible to enable the module eUICC1 to interact with the outside via the terminal T in which it is embedded. By way of example, the terminal T may act merely as a relay between the module eUICC1 and the outside (as applies for example to the "consumer" protocol of the SGP.22 standard [RSP technical specification—version 1.1—Jun. 9, 2016]). In another example the terminal T may play a greater part in the co-operation between the module eUICC1 and the outside (e.g. as applies in the machine-to-machine (M2M) protocol of the SGP.02 standard [Remote provisioning architecture for embedded UICC technical specification—version 3.1—May 27, 2016]). Except under particular circumstances, the way in which the terminal T acts as an interface between the module eUICC1 and the outside is not described in detail below, since that is not necessary for understanding the invention.

Furthermore, in the implementations below, the operator MNO orders a communications profile P1 to be installed in the module eUICC1 in the manner shown in FIG. 5 in a particular example. The communications profile P1 may comprise a plurality of profile elements (PE), referenced PE1 to PEn, n being an integer greater than or equal to 2. In this example, the first profile element PE1 constitutes the header PEH of the profile P1. In the following examples, the profile header PEH constitutes a first portion PR1 of the profile P1 and the profile elements PE2 to PEn constitute, in combination, a second portion PR2 of the profile P1.

As shown in FIG. 5, the header PEH of the profile P1 includes a list LT1 of at least one identifier ID for a service associated with said profile P1. Various list examples LT1 are described in greater detail below with reference to FIGS. 7, 9, and 11.

In a particular example, the profile P1 shown in FIG. 5 complies from a structural point of view with the above-mentioned GSMA standard.

In a particular example, during the stages of loading and installing the profile P1 in the module eUICC1, the profile P1 is in the form of a compact description in compliance with the SIMALLIANCE standard, as shown in FIG. 5.

Figure 6:
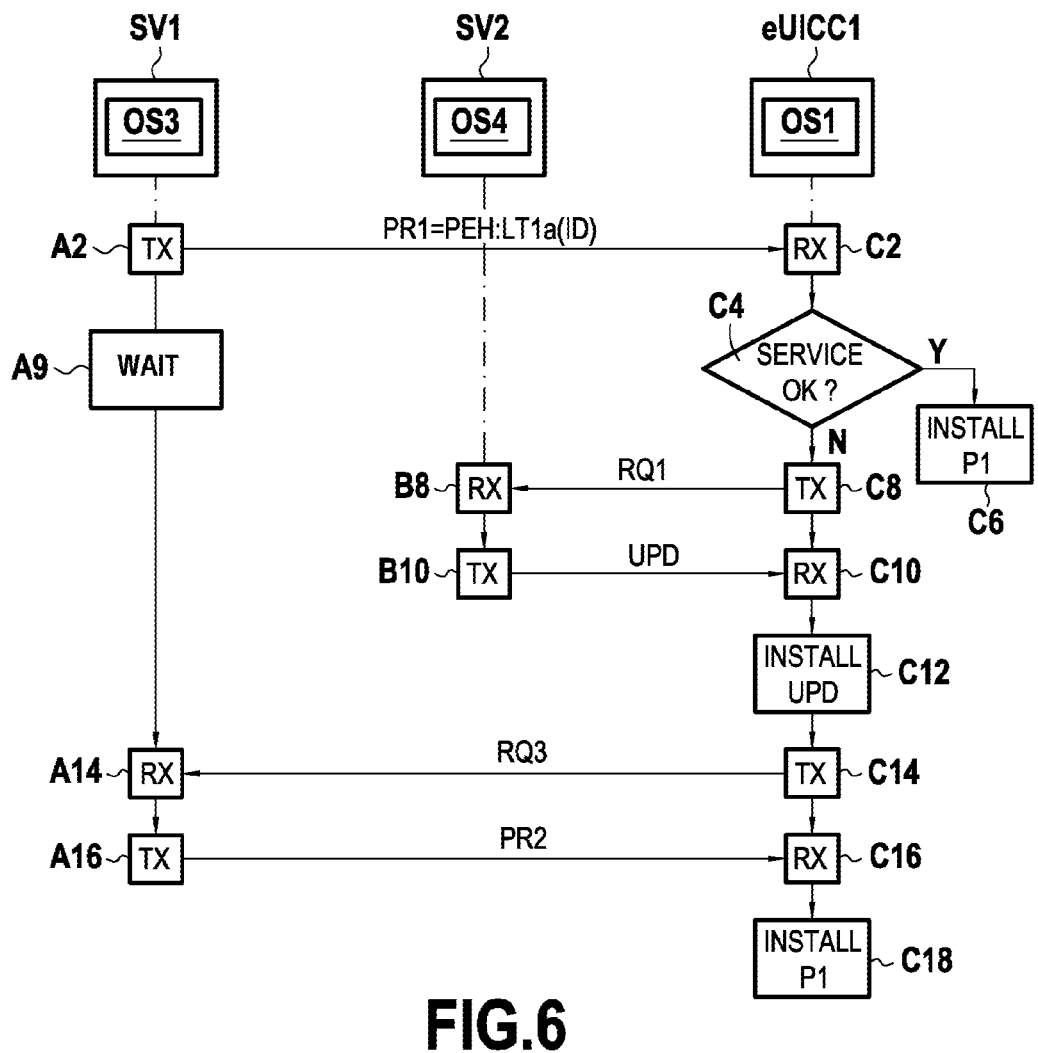
FIG. 6 is a flow chart showing the steps of a control method of the invention performed by an eUICC module and by a profile provisioning server, in a particular implementation of the invention.
Figure 7:
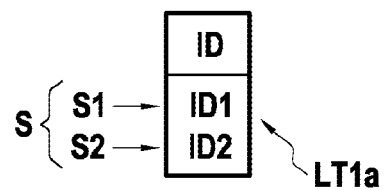
FIG. 7 is a diagram showing a list of service identifiers, in a particular implementation of the invention.

With reference to FIGS. 5, 6, and 7, there follows a description of a particular implementation of the invention as performed by the module eUICC1, by the profile provisioning server SV1, and by the updating server SV2. For this purpose, the module eUICC1 executes the operating system OS1 in order to perform a control method in a particular implementation, and the profile provisioning server SV1 executes the operating system OS3 in order to perform a control method in a particular implementation.

Herein, it is assumed initially that the communications profile P1 is not present in the secondary secure domain ISD-P1 of the module eUICC1, and that the operator MNO associated with the profile P1 attempts to cause the profile P1 to be installed in the module eUICC1 in order to enable the terminal T to access at least one service S associated with the profile P1.

As shown in FIG. 5, the header PEH of the profile includes a list LT1 of at least one identifier ID of a respective service S associated with the profile P1. As shown in FIG. 7, it is assumed herein that the list LT1, written LT1a in this implementation, comprises two identifiers ID1 and ID2 (referred to collectively as ID) corresponding respectively to services S1 and S2 (referred to collectively as S). It should be understood that the number and the nature of the service (s) associated with the profile P may vary depending on circumstances.

As shown in FIG. 6, the profile provisioning server SV1 sends (A2) to the module eUICC1, the list LT1a of identifiers ID1 and ID2 for respective services S1 and S2 of the communications profile P1 that is/are to be performed when said profile P1 is installed and in the active state in the module eUICC1.

Thereafter, the module eUICC1 receives (C2) the list LT1a identifying the services S1, S2 of the profile P1 that are to be performed by the module eUICC1 when said profile P1 is installed and in the active state in the module eUICC1.

In the presently-considered example, during the send step A2, the server SV1 sends to the module eUICC1 a first portion PR1 of the profile P1, this portion including the list LT1a of identifiers ID1 and ID2. As shown in FIG. 5, it is assumed in this implementation that the first portion PR1 constitutes the header PEH of the profile P1, although other implementations are possible. The module eUICC1 thus receives (C2) the first portion PR1 (specifically the header PEH in this example) of the profile P1 including the list LT1a.

Once the first portion PR1 has been sent (A2) to the module eUICC1, the server SV1 waits (A9) until a step A14 that is described below. In a particular example, after sending (A2) the identifiers ID, the server SV1 waits (A9) on receiving a wait (or suspension) request sent by the module eUICC1. As described below, such waiting (A9) means that the server SV1 (in this example its send module MD20) defers sending to the module eUICC1 at least a portion of the profile P1, specifically the second portion PR2 in the present example.

Furthermore, after receiving (C2) the first portion PR1, the module eUICC1 determines (C4) whether each service S specified in the receive list LT1a (i.e. the services S1 and S2 in this example) is supported by the operating system OS1 of the module eUICC1.

In the event that each service S (specifically S1 and S2 in this example) is supported by the operating system OS1, the method comes to an end. Under such circumstances, the module eUICC1 installs (C6) e.g. the communications profile P1 in the secondary secure domain ISD-P1 after receiving all of the missing portions making up the profile.

In contrast, if the module eUICC1 determines (C4) that at least one service S identified in the list LT1a it has received (C2) is not supported by the operating system OS1, then the module eUICC1 proceeds with step C8.

In C8, the module eUICC1 sends an updating request RQ1 to the updating server SV1 in order to update the operating system OS1. The server SV1 receives the updating request RQ1 in a step B8. In a particular example, the updating request RQ1 is sent by the module eUICC1 to a predefined network address, which address may for example be pre-stored in memory in the module eUICC1.

In response to the request RQ1, the server SV2 determines whether an update UPD of the operating system OS1 is available, and if so, it sends (B10) the update UPD to the module eUICC1.

If such an update UPD for the operating system OS1 is available, the module eUICC1 receives it (C10), and then proceeds to install it (C12) so as to enable the operating system OS1 to run the communications profile P1, at least in part. In a particular example, installing (C12) the update UPD in the module eUICC1 enables its operating system OS1 to support at least one service S specified in the list LT1a that said operating system OS1 used not to support (C4) before said updating (C12). In a particular example, installing (C12) the update UPD now enables the operating system OS1 to support each service S specified in the list LT1a received in step C2.

After completing installation (C12) of the update UPD, the module eUICC1 sends (C14) a request RQ3 to the profile provisioning server SV1 in order to continue (i.e. carry on with) receiving the communications profile P1 that is to be installed in said module eUICC1. As mentioned above, the module eUICC1 has already received (C2) the first portion PR1 (specifically the header PEH in this example) of the profile P1, which portion includes the list LT1a. Since the operating system OS1 is now up to date, the module eUICC1 requests (C14) the server SV1 to continue with receiving the profile P1 in order to receive the missing portion of the profile P1, i.e. the second portion PR2, as shown in FIG. 5. In step A14, the server SV1 receives the request RQ3 to continue receiving the profile P1, and in response to this request RQ3, it terminates its waiting stage A9 and sends (A16) all or part of the profile P1 to the module eUICC1 so as to enable the profile P1 to be installed in the module eUICC1. In the presently-considered example, the module eUICC1 has already received (C2) a first portion PR1 (the header PEH in this example) of the profile P1. In this example, the profile provisioning server SV1 sends (A16) the second portion PR2 (shown in FIG. 5) of the profile P1 in addition to the first portion PR1 that was received in step C2, so as to enable the module eUICC1 to obtain the entire profile P1 for installing. In a particular example, these first and second portions PR1 and PR2 together form the entire profile P1 in full (under such circumstances the portion PR2 comprises the profile elements PE2 to PEn of the profile P1, as shown in FIG. 5).

From the profile portions PR1 and PR2 as received respectively in step C2 and in step C16, the module eUICC1 thus recovers all of the profile P1. The module eUICC1 can then carry out any appropriate processing on the data contained in the portions PR1 and PR2 in order to obtain the profile P1 that is to be installed.

During an installation step C18, the module eUICC1 then installs the profile P1. In this example, the profile P1 is installed in the secondary secure domain ISD-P1 of the module eUICC1.

Once the communications profile P1 has been installed (C18), the module eUICC1 (and more particularly its privileged secure domain IDS-R) is capable of switching the profile P1 between an active state and an inactive state. When the profile P1 is configured in the active state, it authorizes the communications terminal T to communicate with the communications network R associated with said profile P1, e.g. in order to access the services S1 and S2 specified in the profile P1. As mentioned above, and by way of example, the profile P1 includes subscription data for identifying and/or authenticating the user who has subscribed to the services S1 and S2 with the operator MNO of the network R.

It can be understood that other variant implementations are possible, in particular in which the identifier(s) ID received by the module eUICC1 in step C2 are not included in a first portion PR1 of the profile P1 (by way of example, the identifiers ID are sent in some other message independent of the profile P1). Under such circumstances, after completing installation (C12) of the update UPD, the module eUICC1 sends (C14) a request RQ3 to the profile provisioning server SV1 in order to receive the communications profile P1 for installing in the module eUICC1 (as contrasted with continuing to receive it).

When an eUICC module detects that its operating system does not support at least one service specified in a profile that is to be installed, the invention advantageously enables said eUICC module to obtain the necessary update in order to mitigate, at least in part, its inability to perform said at least one non-supported service. Once the update has been performed, the eUICC module can install the profile so as to give access to one or more services associated with said profile when the profile in question is in the active state.

Figure 8:
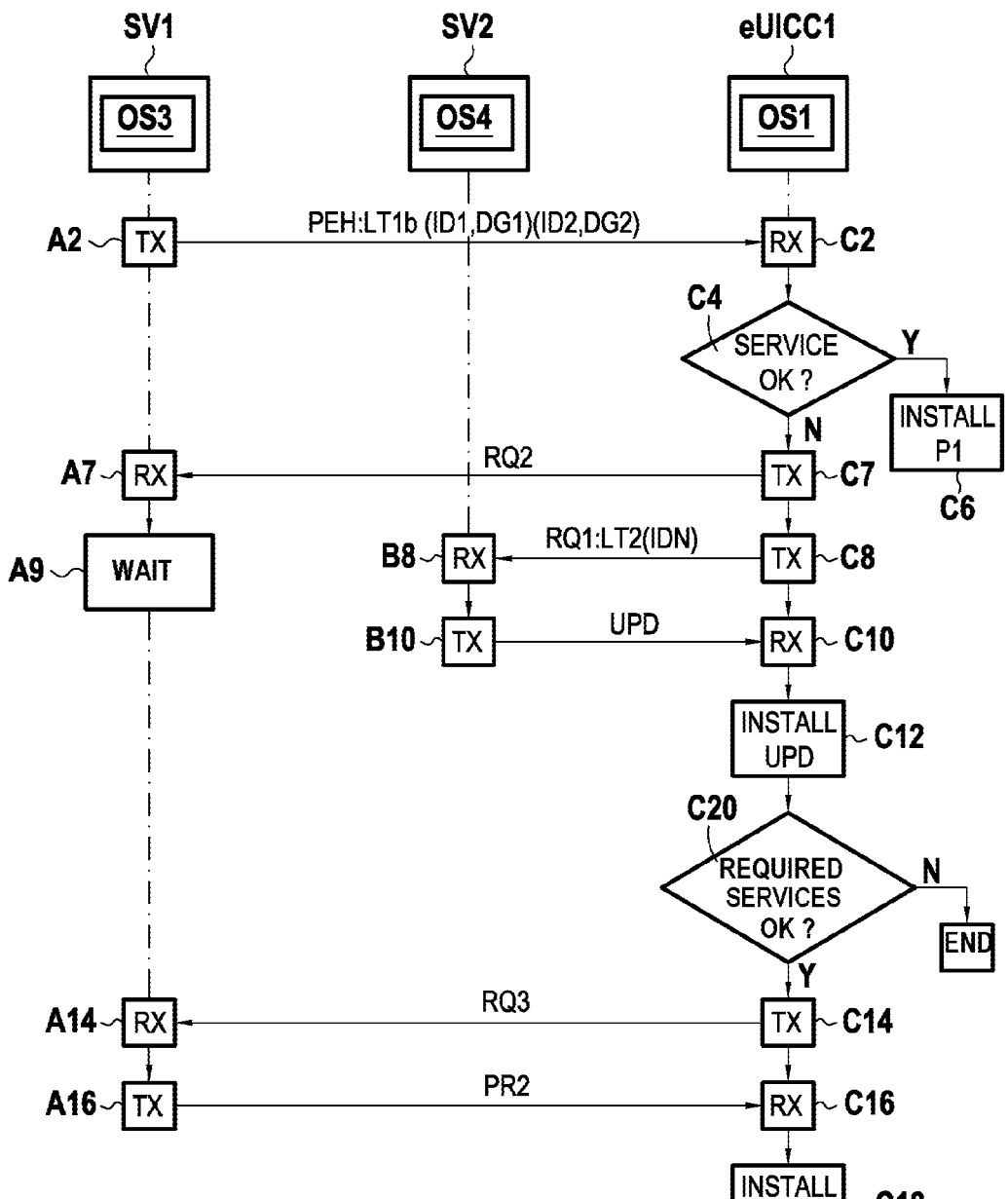
FIG. 8 is a flow chart showing the steps of a control method performed by an eUICC module and by a profile provisioning server in a particular implementation of the invention.
Figure 9:
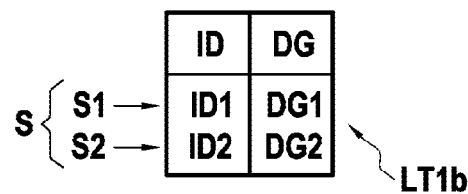
FIG. 9 is a diagram showing a list of service identifiers in a particular implementation of the invention.

With reference to FIGS. 8 and 9, there follows a description of a particular implementation of the invention as performed by the module eUICC1, the profile provisioning server SV1, and the update server SV2 as shown in FIG. 1. For this purpose, the module eUICC1 executes the operating system OS1 in order to perform a control method in a particular implementation, and the profile provisioning server SV1 executes the operating system OS3 in order to perform a control method in a particular implementation.

Once more, it is assumed that the communications profile P1 is not present in the secondary secure domain ISD-P1 of the module eUICC1, and that the operator MNO associated with the profile P1 is attempting to have the profile P1 installed in the module eUICC1 in order to give the terminal T access to at least one service associated with the profile P1.

In this example, the communications profile P1 for installing in the module eUICC1 is shown in FIG. 5, as described above. The header PEH of the profile P1 in this example includes a list LT1, now referenced LT1b, as shown in FIG. 9. As for the above-described list LT1a, the list LT1b now contained in the header PEH of the profile P1 comprises the identifiers ID1, ID2 (respectively referenced ID) of the services S1, S2 (collectively referenced S). The list LT1b contained in this example in the header PEH also includes, in association with each service identifier ID1, ID2, a respective degree of importance DG1, DG2 of the service (referenced collectively DG), the degree of importance DG indicating whether it is required that the corresponding service S is supported by the operating system OS1 when the communications profile P1 is installed in the module eUICC1.

By way of example, each degree of importance DG may take one out of two distinct states, namely: a first state indicating that the associated service S needs to be supported by the operating system OS1 when the communications profile P1 is installed in the module eUICC1, and a second state indicating that the associated service S need not necessarily be supported by the operating system OS1 when the communications profile P1 is installed in the module eUICC1.

As shown in FIG. 8, the profile provisioning server SV1 sends (A2) the header PEH of the profile P1 to the module eUICC1, and does so in the same manner as the send step A2 shown in FIG. 6. As mentioned above, the list LT1b present in the header PEH of the profile P1 includes the service identifiers ID1, ID2 together with the associated degrees of importance DG1, DG2. The number and the nature of the services specified in the list LT1b may vary depending on circumstances.

In this example, it is assumed that the services S1 and S2 are required in the sense that the associated degrees of importance DG1 and DG2 indicate that these services S1 and S2 must necessarily be supported by the operating system OS1 when the communications profile P1 is installed in the module eUICC1.

The module eUICC1 receives the header PEH in step C2, and then determines (C4), as described above with reference to FIG. 6, whether each service S specified in the received list LT1b (i.e. the services S1 and S2 in this example) is supported by the operating system OS1 of the module eUICC1.

For this purpose, in this example, during the determination step C4, the module eUICC1 compares the capabilities CAP of the operating system OS1 with each of the services S specified in the list LT1 received in step C2. For this purpose, the module eUICC1 consults the list TB shown in FIG. 2 and compares its capabilities CAP1-CAP4 with the services S1, S2 corresponding respectively to the identifiers ID1, ID2 contained in the list LT1b.

When the services S1 and S2 are supported by the operating system OS1, the method comes to an end. Under such circumstances, the module eUICC1 installs (C6) e.g. the communications profile P1 in the secondary secure domain ISD-P1.

In contrast, if in step C4 the module eUICC1 determines that at least one of the services S1, S2 identified in the list LT1b is not supported by the operating system OS1, the method continues with step C7.

In this example, it is assumed that in step C4 the module eUICC1 detects that the service S1 is supported by OS1, but that the service S2 is not supported by OS1.

As shown in FIG. 8, in step C7, the module eUICC1 sends a wait (or suspension) request RQ2 to the profile provisioning server SV1 in order to defer continuing with reception of the profile P1. The server SV1 receives RQ2 in step A7. As mentioned above, the module eUICC1 has already received in step C2 a first portion PR1 of the profile P1 for installing, namely the header PEH containing the list LT1b in this example. Sending the wait request RQ2 serves to defer the server SV1 sending the missing portion PR2 of the profile P1, which missing portion comprises the profile elements PE2 to PEn. In response to this request RQ2, the server SV1 waits (A9) so as to give the module eUICC1 sufficient time to update its operating system OS1 (if possible).

In step C8, the module eUICC1 sends an updating request RQ1 to the updating server SV2 in order to update the operating system OS1, as described above with reference to FIG. 6. The server SV2 receives the updating request RQ1 in step B8. In this example, the request RQ1 comprises a list LT2 including the identifier IDN of the or each service S identified in step C4 as not being supported by the operating system OS1. Since the service S2 is not supported by OS1 in this example, the list LT2 thus contains the identifier ID2 as the identifier IDN of a service that is not supported.

In a particular example, the module eUICC1 sends (C8) the list LT1 to the updating server SV2. In other words, the list LT2 sent in step C8 is then identical to the list LT1 received in step C2. The list LT1 enables the updating server SV2 to determine whether a usable update is available for the module eUICC1.

As described above with reference to FIG. 6, in response to the request RQ1, the server SV2 determines whether an update UPD for the operating system OS1 is available, and if so it sends (B10) the update UPD for the module eUICC1.

If such an update UPD for the operating system OS1 is available, the module eUICC1 proceeds with steps C10 and C12 as described above with reference to FIG. 6. More particularly, the module eUICC1 receives (C10) the update UPD and then proceeds with installing (C12) it so as to enable the operating system OS1 to perform the communications profile P1, at least in part.

Once the update (C12) has been performed, the module eUICC1 determines (C20) whether the operating system OS1 supports at least each of the required services S in the communications profile P1, i.e. each of the services S that is associated with a degree of importance DG indicating that it must necessarily be supported by the operating system OS1. In other words, the module eUICC1 verifies (C20) whether the operating system OS1, once updated in step C12, is capable of performing each service S that is specified as being required in the list LT1b. If so, the method continues with step C14. Otherwise, the method comes to an end (by way of the example, the module eUICC1 notifies the profile provisioning server SV1 that it is abandoning the process for installing the profile P1).

It is assumed at this point that the services S1 and S2 are required and that, as a result of the update UPD, the operating system OS1 now supports the services S1 and S2. Under such circumstances, the module eUICC1 performs the steps C14, C16, and C18, and the server SV1 performs the steps A14 and A16, as described above with reference to FIG. 6.

Thus, the module eUICC1 sends (C14) a request RQ3 to the profile provisioning server SV1 in order to continue (or restart) receiving the profile P1 for installing in the module eUICC1. As mentioned above, the module eUICC1 has already received (C2) the first portion PR1 (namely the header PEH in this example) of the profile P1, this portion including the list LT1b. Since the operating system OS1 is now up to date and suitable for performing the services S1 and S2, the module eUICC1 requests (C14) the server SV1 to continue with receiving the profile P1 in order to receive the missing portion PR2 of the profile P1. The server SV1 receives (A14) the request RQ3 to continue with receiving the profile P1, and in response to this request RQ3, it sends (A16) to the module eUICC1 all or part of the profile P1 (i.e. the second portion PR2 in this example) so as to enable the profile P1 to be installed in the module eUICC1.

From the profile portions PR1 and PR2 received respectively in steps C2 and C16, the module eUICC1 thus recovers the entire profile P1 and installs it in the secondary secure domain ISD-P1 during an installation step C18, as described above with reference to FIG. 6.

Once the communications profile P1 has been installed (C18), the module eUICC1 (and more particularly its privileged secure domain IDS-R) is capable of switching the profile P1 between an active state and an inactive state, as likewise described with reference to FIG. 6.

At this point it should also be understood that other variant implementations are possible, in particular in which the module eUICC1 does not receive (C2) the identifier(s) ID of service(s) S in a first portion PR1 of the profile P1, but receives it or them in some other suitable form (e.g. in some other message independent of the profile P1). Under such circumstances, the module eUICC1 sends (C14) a request RQ3 to the profile provisioning server SV1 in order to receive the communications profile P1 for installing in the module eUICC1 (as contrasted to: in order to continue receiving it).

Where necessary, the invention makes it possible to update the operating system of an eUICC module prior to installing a communications profile in order to ensure that the profile can be used in the best conditions by the eUICC module. In particular, the invention makes it possible to ensure that the eUICC module is capable of performing each required service specified in the profile under consideration prior to proceeding with installing the profile in the eUICC module in question.

The invention also makes it possible to allow the eUICC module sufficient time to proceed with updating its operating system, should such updating be necessary, prior to receiving the missing portion(s) of the profile that is to be installed. Advantageously, the eUICC module may optionally abandon downloading the profile in question if it detects that no update will enable it to support each of the required services associated with said profile, thereby saving on resources in the network, in the module eUICC1, and in the profile provisioning server SV1.

Figure 10:
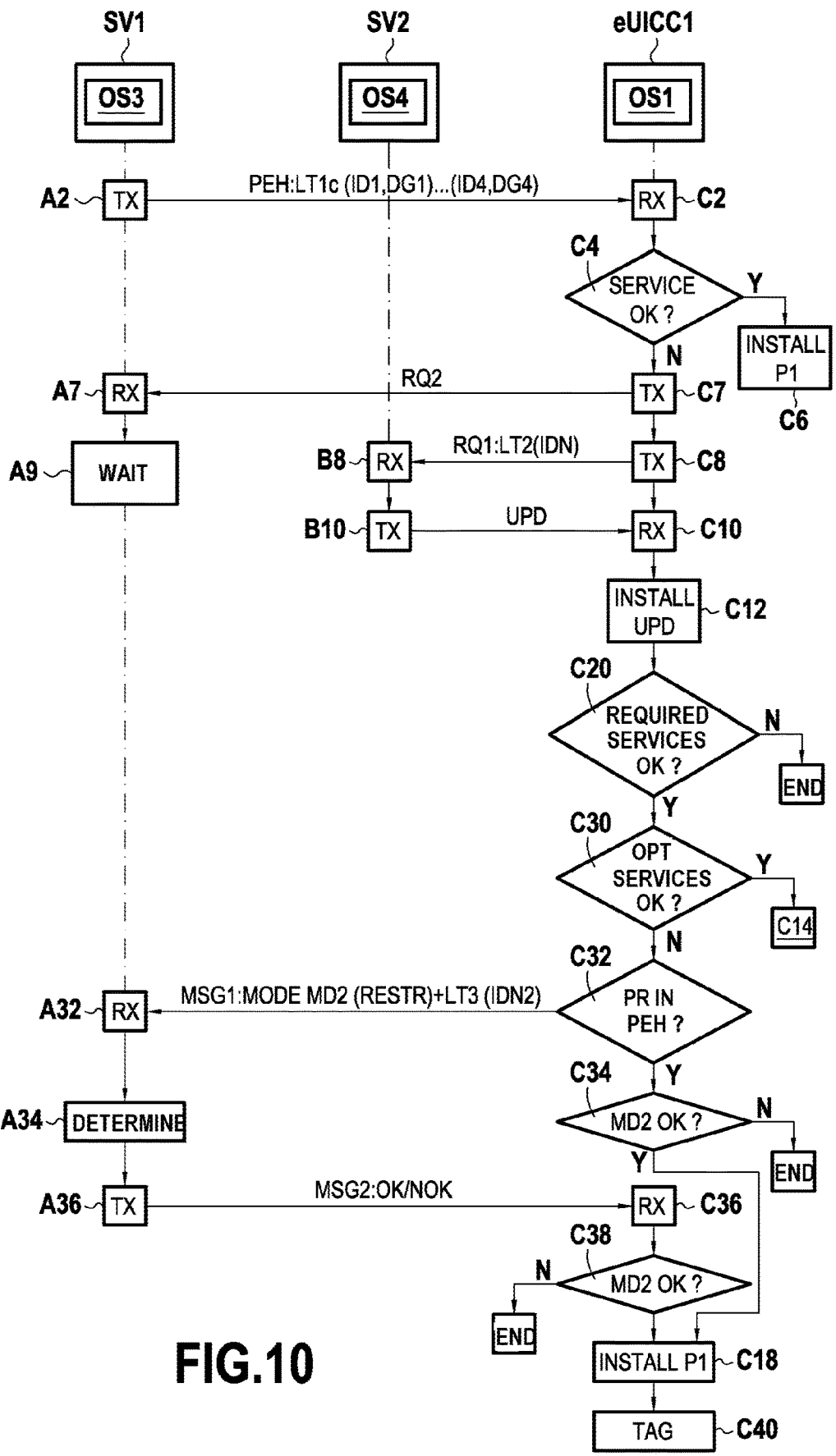
FIG. 10 is a flow chart showing the steps of a control method performed by an eUICC module and by a profile provisioning server in a particular implementation of the invention.
Figure 11:
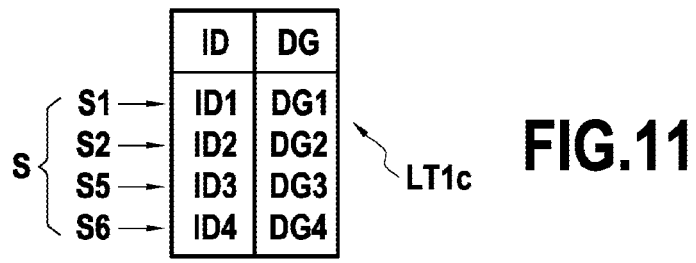
FIG. 11 is a diagram showing a list of service identifiers in a particular implementation of the invention.

With reference to FIGS. 10 and 11, there follows a description of a particular implementation of the invention performed by the module eUICC1, the profile provisioning server SV1, and the updating server SV2. To do this, the module eUICC1 executes the operating system OS1 in order to perform a control method in a particular implementation, and the profile provisioning server SV1 executes the operating system OS3 in order to perform a control method in a particular implementation.

Once more, it is assumed that the communications profile P1 is not present in the secondary secure domain ISD-P1 of the module eUICC1, and that the operator MNO associated with the profile P1 is attempting to cause the profile P1 to be installed in the module eUICC1 in order to enable the terminal T to access at least one service associated with the profile P1.

In this example, the communications profile P1 for installing in the module eUICC1 is shown in FIG. 5, as described above. The header PEH of the profile P1 in this example includes a list LT1, now written LT1c, as shown in FIG. 11. It is assumed at this point that the list LT1c contained in the header PEH of the profile P1 comprises the identifiers ID1 to ID4 (referenced collectively ID) of the respective services S1 to S4 (referenced collectively S). In association with each identifier ID1 to ID4, the list LT1c also includes a respective degree of importance DG1 to DG4 (referenced collectively SG) as described above with reference to FIG. 9, with this degree of importance DG indicating whether the corresponding service must necessarily be supported by the operating system OS1 when the communications profile P1 is installed in the module eUICC1.

In this example, it is assumed that the services S1 and S2 are specified by their associated degrees of importance DG1 and DG2 as being services that are required, while the services S3 and S4 are specified by their respective degrees of importance DG3 and DG4 as being services that are optional.

In this implementation shown in FIG. 10, the server SV1 performs the steps A2 to A9 and the module eUICC1 performs the steps C2 to C12 and C20 as described above with reference to FIG. 8. By way of example, it is assumed at this point that the required services S1, S2 are not supported initially (in step C4) by the operating system OS1, thereby causing the operating system OS1 to be updated (C12) as described above with reference to FIG. 8.

During the determination step C20, the module eUICC1 determines whether its operating system OS1, now up to date, supports at least each required service S of the profile P1, i.e. each service (S1 and S2 in this example) that is specified by the associated degree of importance DG as being necessarily supported by the operating system OS1. If so, the method continues with step C30. Otherwise, the method comes to an end (by way of example, the module eUICC1 notifies the profile provisioning server SV1 that it is abandoning the process of installing the profile P1).

During a determination step C30, the module eUICC1 determines whether its operating system OS1, now up to date, also supports each optional service S of the profile P1, i.e. each service (S3 and S4 in this example) that is specified by the associated degree of importance DG as not necessarily being supported by the operating system OS1. If so, the method continues with step C14 as described above with reference to FIG. 8. Otherwise, the method continues with step C32.

It should be observed that the module eUICC1 may perform the steps C20 and C30 either one after the other, or else simultaneously.

In this example, it is assumed that the module eUICC1 determines (C30) that the optional service S3 is supported by the operating system OS1, but that the optional service S4 is not supported by the operating system OS1.

At this stage, various implementations of the invention are possible. In the presently-considered example, the module eUICC1 determines (C32) whether a parameter PR has been received in the header PEH during the receive step C2, which parameter indicates whether the module eUICC1 is authorized (or required) to perform the service(s) S of the profile P1 in restricted manner. Use (or performance) is said herein to be "restricted" when, for a profile in the active state, the module eUICC1 performs said profile in part only in the sense that at least one optional service of said profile is not supported by the eUICC module. For restricted use of a profile (or more precisely of services of the profile), the module eUICC1 operates in a "restricted use" mode MD2.

In the presently-considered implementation, the server SV1 sends (e.g. in step A2) the first portion PR1 (specifically the header PEH) that includes the parameter PR. For this purpose, an SM-DP server (as shown in FIG. 1) serves for example to insert this parameter PR beforehand into the first portion PR1 of the profile P1 during a stage of preparation or of personalization (creating the profile, . . . ). By way of example, the parameter PR is inserted by the SM-DP server into policy rules that are present in the profile P1. By way of example, these rules comply with the standard. Thereafter, the SM-DP server transmits all or part of the profile P1 to the server SV1 in order to send (A2) the first portion PR1 with the parameter PR to the module eUICC1.

Depending on the manner in which it is configured, the server SV1 (co-operating with the SM-DP server as mentioned above) may use this parameter PR to indicate that the module eUICC1 is authorized, or required, to configure itself in a restricted use mode when at least one optional service is not supported.

If, in step C32, the module eUICC1 determines that the parameter PR has indeed been received in the header PEH during the receive step C2, the method continues with step C34. Otherwise, the module eUICC1 sends a message MSG1 to the server SV1 asking whether it is authorized (or required) to operate in restricted use mode MD2. In a particular example, the message MSG1 further comprises a list LT3 including the identifier IDN2 of the optional service(s) S of the profile P1 that the operating system OS1 does not support. In a particular example, the message MSG1 includes an identifier of the profile P1 for installing and running in the module eUICC1.

In response to the message MSG1 received in step A32, the profile provisioning server SV1 determines (A34) whether the module eUICC1 is authorized (or required) to run the profile P1 in the restricted use mode MD2. Where appropriate, this determination (A34) may be performed as a function of the list LT3 and/or of the identifier of the profile P1, if these elements are present in the message MSG1. The operator of the server SV1 can thus inform remotely each eUICC module whether the restricted use mode MD2 may (or must) be applied.

If, in step A34, it determines that the restricted use mode MD2 is authorized (or required), the server SV1 sends (A36) in response a second message MSG2 indicating that the module eUICC1 is authorized (or required) to run the services S of the profile P1 in restricted manner (mode MD2).

The module eUICC1 receives the message MSG2 in step C36 and, from the message MSG2 from the server SV1, it determines (C38) whether it needs to run the profile P1 in the restricted use mode MD2. If not, the method comes to an end. Otherwise (mode MD2 authorized/required), the method continues with step C18 during which the module eUICC1 installs the profile P1 as described above. To do this, by way of example, the module eUICC1 performs the steps C14 and C16 (not shown in FIG. 10) as described above with reference to FIGS. 6 and 8 in order to receive the missing portion PR2 of the profile P1. Alternatively, the module eUICC1 receives the portion PR2 of the profile P1 in response to the message MSG1 without it being necessary for the module eUICC1 to send a specific request.

Furthermore, if in step C32 the module eUICC1 determines that the parameter PR has indeed been received in the header PEH during the receive step C2, the method continues with C34. During the determination step C34, and on the basis of the previously received parameter PR, the module eUICC1 determines whether it is to run the profile P1 in restricted use mode MD2. Otherwise, the method comes to an end. If mode MD2 is authorized and/or required, the method continues with step C18, as above.

In a particular example, in step C34, the module eUICC1 determines that it is to run the profile P1 in restricted use mode MD2 only if the parameter PR received in step C2 is in a predefined state. By way of example, the parameter PR may be defined by a code bit in the header PEH received in step C2, this bit triggering or not triggering switching of the module eUICC1 into restricted use mode MD2 depending on the value that has been given to it.

Once the installation step C18 has been performed, the module eUICC1 is configured, when this profile P1 is in the active state, so as to perform the services S of the profile P1 in part (i.e. in restricted use mode MD2) (in this example only the services S1, S2, and S3 are run).

Optionally, the module eUICC1 sends a notification to the server SV1 indicating that said module eUICC1 is configured to perform the services S of the profile P1 in restricted manner (mode MD2).

The invention thus enables a module eUICC1 to run a communications profile in part in the event of at least one optional service of the profile not being supported by the operating system of the eUICC module, insofar as such partial performance is authorized or required by the associated operator MNO.

In a particular implementation, after installing (C18) the profile P1, the module eUICC1 tags (C40) the communications profile P1 so as to indicate that at least one optional service S of the profile P1 (specifically the service S4 in this example) is not supported by the operating system OS1. This tagging enables a third party to know that the module eUICC1, and thus the terminal T, runs the profile P1 in the restricted use mode MD2. By way of example, the terminal T may be configured on the basis of this tagging to notify a user to indicate that the profile P1 is used in restricted manner (mode MD2).

In a particular example, during the tagging step C40, the module eUICC1 modifies (or gives a value to) a parameter in the communications profile P1 installed in said module eUICC1 in order to indicate that it is configured to perform the services S of the profile P1 in restricted manner. In a particular example, this modification is performed in a register associated with the profile P1. By way of example, the register may be contained in the secondary secure domain ISD-P1, or in the privileged secure domain ISD-R of the module eUICC1, or more generally in a memory of the module eUICC1.

In a variant of the implementation described above with reference to FIG. 10, in response to the request RQ1 to update the operating system OS1, the module eUICC1 receives a notification from the updating server SV2 indicating the service(s) that is/are not supported by the operating system OS1 and that would be supported if the available update UPD were to be installed in the module eUICC1. The module eUICC1 can thus use this notification to determine whether operation in restricted use mode MD2 is required even before updating the operating system. In a particular implementation, if operation in mode MD2 is required, then prior to updating the operating system OS1, the module eUICC1 determines whether the server SV1 authorizes (or requires) operation to be in restricted use mode MD2, e.g. as described above with reference to the steps C32-C38. In this way, it is possible in particular to avoid updating the operating system of the eUICC module if such an update would not enable the eUICC module subsequently to run the communications profile that is to be installed, thereby saving on resources in the network.

It should also be observed that assuming the module eUICC1 runs the profile P1 in the restricted use mode MD2, subsequent updating of the operating system OS1 may be performed by the module eUICC1 in order to reduce the number of optional services that are not supported, or, where possible, in order for each optional service in the operating system P1 to be supported by the module eUICC1. Under such circumstances, the module eUICC1 may operate in non-restricted use mode MD1 (i.e. normal mode) such that each required and optional service of the profile P1 can be run when the profile is in the active state in the module eUICC1.

Figure 12:
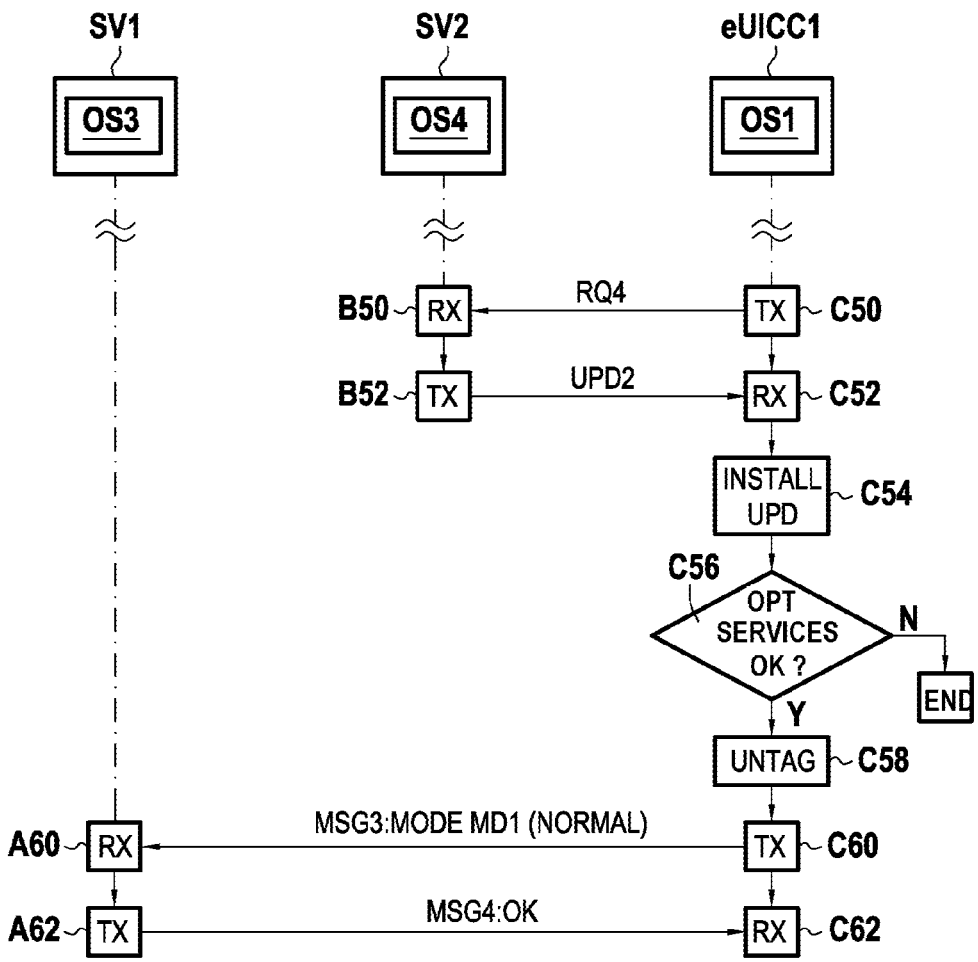
FIG. 12 is a flow chart showing the steps of a control method performed by an eUICC module and by a profile provisioning server in a particular implementation of the invention.

Consideration is given below to a particular implementation in which the method described with reference to FIG. 10 continues as shown in FIG. 12. It is assumed at this point that the module eUICC1 runs the profile P1 in restricted manner since its operating system OS1 does not support the optional service S4 of the profile P1.

More particularly, after a determined time interval, the module eUICC1 sends (C50) a new request RQ4 to update its operating system OS1. In response to this request RQ4 received in step B50, the server SV2 sends (B52) an update UPD2 for the operating system OS1, which is received by the module eUICC1 in step C52. The steps C50-C52 and B50-B52 may be performed respectively in identical manner to the steps C8-C10 and B8-B10 described above with reference to FIGS. 6, 8, and 10.

If an update UPD2 is indeed received in step C52, the module eUICC1 installs (C54) the update in the same manner as in above-described updating step C12, and then determines (C56) whether each optional service S of the profile P1 is now supported by the operating system OS1 (in the same manner as in above-described step C30). Under such circumstances, the method continues with step C58. Otherwise, the method comes to an end.

In step C58, the module eUICC1 configures itself to run the profile P1 in non-restricted use mode MD1, and it possibly modifying the tagging (or removes the tagging) of the profile P1 as previously performed in step C40 (FIG. 10) so as to indicate that each optional service S of the profile P1 (i.e. the services S3 and S4 in this example) is supported by the operating system OS1.

The module eUICC1 sends (C60) a notification MSG3 to the profile provisioning server SV1 in order to inform it that it is now operating in non-restricted use mode MD1 for the profile P1. After this notification MSG3 has been received in step A60, the server SV1 optionally sends (A62) an acknowledgement message MSG4, which is received by the module eUICC1 in step C62.

A person skilled in the art understands that the above-described implementations and variants merely constitute non-limiting examples of implementations of the invention. In particular, the person skilled in the art could envisage any adaptation or combination of the above-described implementations or variants in order to satisfy some particular need.

The invention claimed is:

1. A control method performed by an embedded subscriber identity module for co-operating with a communications terminal, said method comprising:
receiving at least one identifier of a service, of a communications profile, which service is for running when said communications profile is installed and in the active state in the embedded subscriber identity module;

determining whether each service is supported by an operating system of the embedded subscriber identity module;

if not, sending a request to update the operating system;

if an update of the operating system is received in response to sending said request, installing said update enabling the operating system to run said communications profile, at least in part; and after completing said installing, sending a request to receive or to continue receiving the communications profile including said at least one service that is to be installed in said embedded subscriber identity module.

2. A method according to claim 1, comprising, in response to said request to receive or to continue receiving, receiving all or part of the communications profile so as to enable the communications profile to be installed in the embedded subscriber identity module.

3. A method according to claim 1, comprising installing the communications profile in the embedded subscriber identity module once said communications profile has been obtained in full.

4. A method according to claim 1, wherein said communications profile, once installed and in the active state in the embedded subscriber identity module, authorizes the communications terminal to communicate with a communications network associated with said communications profile.

5. A method according to claim 1, wherein the method includes comparing the capabilities of the operating system with each of the services associated with said at least one identifier;

said determining whether at least one said service is supported by the operating system being performed on the basis of the result of said comparing.

6. A method according to claim 1, wherein receiving said at least one identifier comprises receiving a first portion of the communications profile, said first portion including said at least one identifier.

7. A method according to claim 6, wherein the first portion is a header portion of the communications profile.

8. A method according to claim 6, further comprising:

after said update has been installed, sending said request to continue receiving the communications profile in order to receive at least a second portion of the communications profile for completing said first portion so as to obtain the entire communications profile for installing in the embedded subscriber identity module.

9. A method according to claim 1, wherein said at least one identifier is received from a profile provisioning server, and if at least one said service is not supported by the operating system, the method further comprises sending the profile provisioning server a wait request in order to defer receiving at least a portion of the communications profile.

10. A method according to claim 1, further comprising:

while receiving said at least one identifier, receiving, in association with each identifier, a degree of importance of said service, said degree of importance indicating whether the corresponding service must necessarily be supported by the operating system when the communications profile is installed in the embedded subscriber identity module.

11. A method according to claim 10, wherein the embedded subscriber identity module proceeds with sending said request to receive or to continue receiving the communications profile only if the operating system, once updated, supports at least each service of the communications profile that is indicated by the associated degree of importance as being necessarily supported by the operating system.

12. A method according to claim 10, wherein, if the operating system, once updated, does not support at least one service of the communications profile that is indicated by the associated degree of importance as not necessarily being supported by the operating system, the embedded subscriber identity module:

proceeds with sending said request to receive or to continue receiving the communications profile; and once said communications profile has been installed in the embedded subscriber identity module, tags the communications profile so as to indicate that at least one service of the communications profile that does not necessarily need to be supported by said operating system is not supported by said operating system.

13. A method according to claim 12, wherein the tagging comprises modifying a parameter in the communications profile installed in the embedded subscriber identity module in order to indicate that the embedded subscriber identity module is configured to run said at least one service of the communications profile in restricted manner.

14. A method according to claim 10, wherein, if the operating system, once updated, does not support at least one service of the communications profile that is indicated by the associated degree of importance as not necessarily being supported by the operating system, the method comprises:

sending a notification indicating that the embedded subscriber identity module is configured to run said at least one service of the communications profile in restricted manner.

15. A method according to claim 10, wherein said at least one identifier and each associated degree of importance are received in a header of said communications profile, said header further comprising a parameter, wherein after finishing installing the update, the embedded subscriber identity module sends said request to continue receiving the communications profile only if the parameter is in a predefined state.

16. A non-transitory computer readable media including a computer program including instructions that when executed by a computer perform a control method comprising:

receiving at least one identifier of a service of a communications profile, which service is for running when said communications profile is installed and in the active state in the embedded subscriber identity module;

determining whether the service is supported by an operating system of the embedded subscriber identity module;

if the service is not supported, sending a request to update the operating system;

if an update of the operating system is received in response to sending the request, installing the update enabling the operating system to run the communications profile, at least in part; and after completing the installing, sending a request to receive or to continue receiving the communications profile including the service that is to be installed in said embedded subscriber identity module.

17. An embedded subscriber identity module suitable for co-operating with a communications terminal, said embedded subscriber identity module comprising:

a memory containing instructions; and
a processor that is operably connected to the memory, and that executes the instructions to perform operations comprising:
  receiving at least one identifier of at least one service of a communications profile, which service is for running when said communications profile is installed and in the active state in the embedded subscriber identity module;
  determining whether each of the at least one service is supported by an operating system of the embedded subscriber identity module;
  if any of the at least one service is not supported by said operating system, sending a request for updating the operating system,
  if an update of the operating system is received in response to said updating request, installing said update, enabling the operating system to run said communications profile at least in part; and
  after finishing said installing of the update, sending a request to receive or to continue receiving the communications profile including said at least one service that is to be installed in said embedded subscriber identity module.

18. A system comprising an embedded subscriber identity module and a profile provisioning server for supplying a communications profile to said embedded subscriber identity module suitable for co-operating with a communications terminal,
  said embedded subscriber identify module comprising:
    a first memory containing instructions; and
    a first processor that is operably connected to the first memory, and that executes the instructions to perform operations comprising:
      receiving at least one identifier of at least one service of a communications profile, which service is for running when said communications profile is installed and in the active state in the embedded subscriber identity module;
      determining whether each of the at least one service is supported by an operating system of the embedded subscriber identity module;
      if any of the at least one service is not supported by said operating system, sending of a request for updating the operating system,
      if an update of the operating system is received in response to said updating request, installing said update enabling the operating system to run said communications profile at least in part; and
      after finishing said installing of the update, sending a request to receive or to continue receiving the communications profile including said at least one service that is to be installed in said embedded subscriber identity module;
  said profile provisioning server comprising:
    a second memory containing second instructions; and
    a second processor that is operably connected to the second memory, and that executes the second instructions to perform operations comprising:
      sending to said embedded subscriber identity module at least one identifier of a respective service of a communications profile to be run when said communications profile is installed and in the active state in the embedded subscriber identity module;
      sending of said at least one portion of the communications profile to the embedded subscriber identity module to wait;
      after the embedded subscriber identity module has updated said operating system, receiving a request to send or to continue sending the communications profile including said at least one service; and
      in response to receiving said request to send or to continue sending the communications profile, sending all or part of the communications profile so as to enable said profile to be installed in the embedded subscriber identity module.

\* \* \* \* \*